(12) United States Patent
Kamata (10) Patent No.: US 6,443,638 B1
(45) Date of Patent: Sep. 3, 2002

(54) EXPOSURE CONTROL APPARATUS USED FOR A CAMERA

(75) Inventor: Kazuo Kamata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 106 days.

(21) Appl. No.: 09/599,011

(22) Filed: Jun. 22, 2000

(30) Foreign Application Priority Data

Jun. 25, 1999 (JP) .......................................... 11-180674

(51) Int. Cl.⁷ .............................. G03B 9/02; G03B 7/095
(52) U.S. Cl. ...................... 396/508; 396/64; 396/170; 396/506
(58) Field of Search ............................ 396/61, 64, 98, 396/135, 161, 170, 213, 449–451, 459, 470, 506, 508, 155

(56) References Cited

U.S. PATENT DOCUMENTS 5,047,792 A * 9/1991 Asano et al. .................. 396/61
5,579,081 A * 11/1996 Ishiguro ...................... 396/161

* cited by examiner

Primary Examiner—Russell Adams
Assistant Examiner—Arthur A Smith
(74) Attorney, Agent, or Firm—Young & Thompson (57) ABSTRACT

A flash lever for actuating a flash switch is interlocked with a stop plate via a spring. When a picture is taken without a flash, photographing is performed in a state that a small stop opening of the stop plate is disposed at an optical path. When the flash lever is moved to an ON position in order to take a picture with the flash, the flash switch is turned on to activate a flash circuit and a photometry circuit. At this time, the stop plate is evacuated from the optical path so that photographing is performed only through a fixed stop opening. If luminance of a subject is large in this condition, an electric current is supplied to an electromagnet to pull an iron plunger therein for returning the stop plate to the original position. In virtue of this, photographing is performed through the small stop opening.

21 Claims, 10 Drawing Sheets

EXPOSURE CONTROL APPARATUS USED FOR A CAMERA

BACKGROUND OF THE INVENTION

1. Field of the Invention

The present invention relates to an exposure control apparatus used for a simplified camera in which exposure adjustment is automatically performed in accordance with luminance of a subject.

2. Description of the Related Art

A general camera employs an exposure control apparatus for automatically adjusting a shutter speed and an exposure aperture in accordance with luminance of a subject. Feeding electricity to the exposure control apparatus is carried out by turning on a power-supply switch of the camera. The luminance of the subject is measured when a shutter button is depressed by a half stroke.

Recently, a lens-fitted photo film unit is widely used as a kind of a simplified camera. The lens-fitted photo film unit is loaded with a photo film beforehand when it is manufactured. As for such simplified camera, in order to improve its image quality, an exposure control apparatus being simple and automatic is planned to be incorporated therein. Meanwhile, the lens-fitted photo film unit has advantages that it can be manufactured at low cost and it can be easily used. In view of this, in cameras in which the automatic exposure control apparatus is incorporated, it is not preferable, regarding not only its cost but also its handling, to provide a power-supply switch similarly to the ordinary camera.

By the way, in the lens-fitted photo film unit, a battery is also contained at the time of manufacturing so that the battery is adapted to be incapable of replacement. Thus, if the power-supply switch is omitted to always feed the electric power to the exposure control apparatus, there arises a problem of a waste of the electric power. In particular, this problem cannot be bypassed when the electric power for the exposure control apparatus is supplied from a battery being as a power source for a flash device, even if consumption of the electric power for the exposure control apparatus itself is a little.

SUMMARY OF THE INVENTION

In view of the foregoing, it is a primary object of the present invention to provide an exposure control apparatus used for a simplified camera in which a power source is prevented from being wasted without preparing a power-supply switch.

It is a second object of the present invention to provide a simplified camera in which it is possible to take a picture, using an exposure control apparatus.

In order to achieve the above and other objects, the camera according to the present invention comprises the exposure control apparatus including a photometry circuit and a light regulating unit. The photometry circuit measures the luminance of the ambient light and judges whether or not the measured luminance is higher than a prescribed level. When the luminance of the ambient light is judged to be higher than the prescribed level, the light regulating unit reduces the exposure light passing through a taking lens. Feeding the electricity to the exposure control apparatus is carried out in association with a turning-on operation of a flash switch for activating a built-in flash device.

The light regulating unit includes a movable stop plate provided with a small stop opening. This small stop opening is smaller than a fixed stop opening. When the flash switch is turned off, the small stop opening is disposed at an optical path of the taking lens. When the flash switch is turned on and the luminance of the ambient light is the prescribed level or less, the stop plate is evacuated from the optical path by means of a spring. When the flash switch is turned on and the luminance of the ambient light is higher than the prescribed level, the stop plate is returned to the optical path by electromagnetic force against the urging force of the spring so that the small stop opening is disposed at the optical path.

Otherwise, the light regulating unit includes a movable stop plate provided with both of a smaller stop opening and a larger stop opening. The smaller stop opening is smaller than the fixed stop opening, and the larger stop opening is larger than the smaller stop opening. When the flash switch is turned off, the smaller stop opening is disposed at the optical path of the taking lens. When the flash switch is turned on and the luminance of the ambient light is the prescribed level or less, the larger stop opening is disposed at the optical path by means of a spring. When the flash switch is turned on and the luminance of the ambient light is higher than the prescribed level, the smaller stop opening is returned to the optical path by electromagnetic force against the urging force of the spring.

Feeding the electricity to the exposure control apparatus is interrupted when a shutter button is not depressed.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

An exposure control apparatus used for a camera according to the present invention is explained below such as to be employed in a lens-fitted photo film unit. However, the exposure control apparatus of the present invention is applicable to a single-lens reflex camera, a compact camera and so forth.

Figure 1:
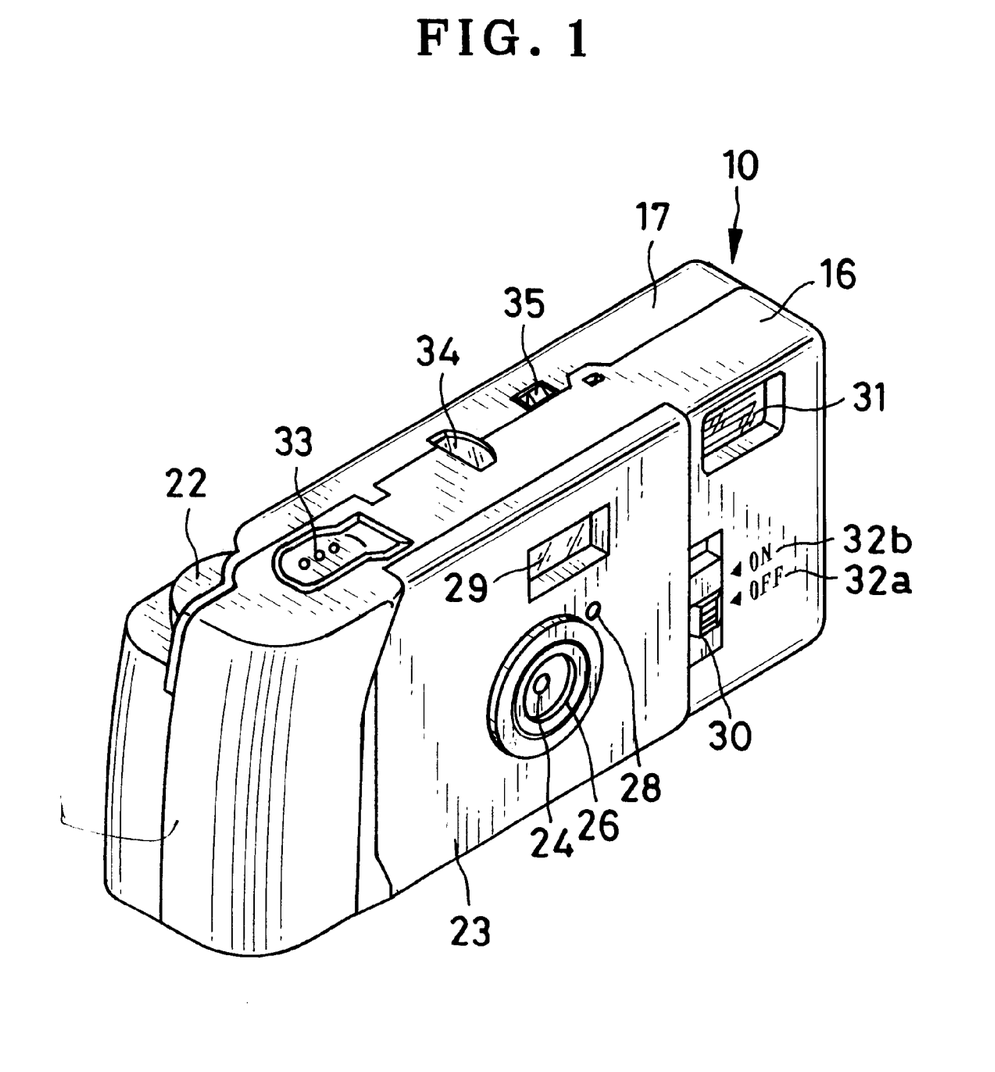
FIG. 1 is a perspective view of a lens-fitted photo film unit according to the present invention.
Figure 2:
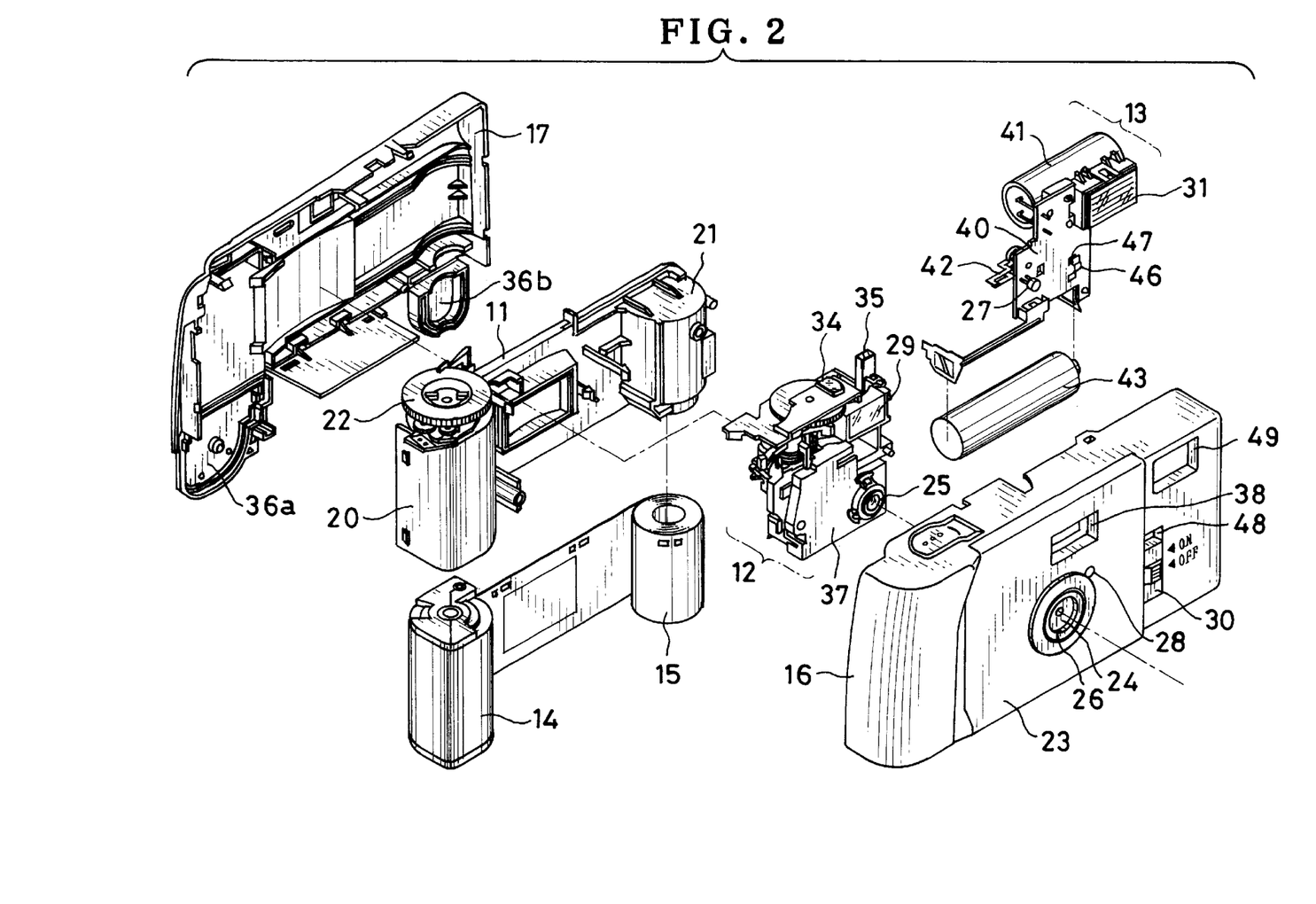
FIG. 2 is an exploded perspective view of the lens-fitted photo film unit.

FIGS. 1 and 2 respectively show a perspective view and an exploded perspective view of the lens-fitted photo film unit 10. This lens-fitted photo film unit 10 is constituted of a main body 11, an exposure unit 12, a flash device 13, a film cartridge 14, and a photo film 15. Further, the lens-fitted photo film unit 10 comprises a front cover 16 and a rear cover 17 for covering the above-noted parts. The exposure unit 12 and the flash device 13 are-attached to the main body 11.

The main body 11 is provided with a cartridge chamber 20 and a film chamber 21 for respectively containing the film cartridge 14 and the photo film 15. Moreover, a knob 22 is attached to the main body 11. A part of the knob 22 emerges from a rear face of the lens-fitted photo film unit 10. The knob 22 engages with a spool of the film cartridge 14 so that the photo film 15 is advanced by rotating the knob 22. When the photo film 15 is advanced by one frame, a shutter mechanism incorporated in the exposure unit 12 is charged. At the same time, a film stopping mechanism provided in the exposure unit 12 is actuated to lock the knob 22.

A front panel 23 is attached to a front face of the front cover 16. The front panel 23 is formed with an exposure opening 26 for exposing a stop plate 24 and a taking lens 25, a photometry opening 28 for exposing a light receiving element 27, and an opening 38 for exposing a viewfinder 29. The light receiving element 27 is for measuring luminance of a subject. The front cover 16 is formed with an opening 48 for a flash lever 30, and is also formed with an opening 49 for a flash portion 31.

The flash lever 30 is vertically slidable to freely switch a flash and a non-flash of the flash portion 31. Its slide position is adapted to be changed in two steps, such as shown by indexes 32a and 32b arranged at a side of the flash lever 30 (see FIG. 4 and so on). The index 32a corresponds to a position represented as OFF (hereinafter OFF position). When the flash lever 30 is set to the OFF position, the flash device 13 is prohibited from being activated so that a picture is taken without a flash. On the other hand, the index 32b corresponds to a position represented as ON (hereinafter ON position). When the flash lever 30 is set to the ON position, the flash device 13 carries out a charging operation for flashing.

In FIG. 1, an upper portion of the lens-fitted photo film unit 10 is provide with a shutter button 33, a film counter 34, and an indicator 35 for indicating completion of charging the flash device 13. The shutter button 33 is associated with a shutter mechanism provided in the exposure unit 12. In virtue of this, the photo film 15 is exposed upon depression of the shutter button 33. The film counter 34 is associated with a shutter charging mechanism provided in the exposure unit 12 to indicate a remaining photographable number of the photo film 15. The indicator 35 is incorporated with a light emitting diode. Based on lighting of this diode, a photographer can confirm the completion of the charging operation for the flash device 13.

The rear cover 17 is formed with bottom lids 36a and 36b for light-tightly covering the bottoms of the film cartridge 14 and the photo film 15. Further, the bottom lid 36a is also used as a lid for drawing out the film cartridge 14 in which the exposed photo film is contained.

The exposure unit 12 is constituted of a dark box 37, the shutter mechanism, the shutter charging mechanism, the film stopping mechanism and so forth. Moreover, to the exposure unit 12, are attached the taking lens 25, the viewfinder 29, the film counter 34 and the indicator 35. A shutter blade (not shown) of a kicking type is provided in the exposure unit 12. The shutter blade is kicked upon the depression of the shutter button 33. When the shutter blade is evacuated from an optical axis, the photo film is exposed. A period for opening the shutter blade is fixed to a predetermined value so that a shutter speed is always constant.

The flash device 13 is provided at a side of the exposure unit 12, and is constituted of the flash portion 31, a circuit board 40, a capacitor 41 and a synchro switch 42. Further, a battery 43 is attached to the bottom of the flash device 13. The battery 43 is used as a power source for activating the flash device 13.

The circuit board 40 is provided with a flash circuit 44, a photometry circuit 45, a comparator 45a, an electronic switch 45b, a switching segment 46, and a conductive portion 47. The flash circuit 44 controls a charging operation and light emission of the flash. The photometry circuit 45 performs photometry for a subject. Meanwhile, a rear face of the flash lever 30 is provided with a protrusion (not shown). When this protrusion pushes the switching segment 46, the switching segment 46 and the conductive portion 47 are contacted as a flash power-supply switch so that the flash circuit 44 is supplied with electricity to be activated. The protrusion does not come into contact with the switching segment 46 when the flash lever 30 is set to the OFF position. But, the protrusion comes into contact with the switch portion 46 to push it when the flash lever 30 is set to the ON position. Commencement and stop of the charging operation for flashing can be switched at will by sliding the flash lever 30.

Flash charging is executed by charging the capacitor 41 with the battery 43. High voltage of about 300 V is applied to the capacitor 41 by a booster circuit provided on the circuit board 40 so that electrical charge being sufficient for firing the flash portion 31 is stored. The flash circuit 44 blinks the light emitting diode of the indicator 35 after the capacitor has been charged.

The synchro switch 42 is attached to the circuit board 40 so as to be associated with the shutter mechanism. When the shutter mechanism is actuated by depression of the shutter button 33, the synchro switch 42 is closed to generate a trigger signal for discharging electricity of the capacitor 41. The flash portion 31 has a built-in flash-discharging tube which emits the light when the capacitor 41 discharges the electricity.

Similarly to the flash circuit 44, the photometry circuit 45 is activated when the switching segment 46 and the conductive portion 47 are contacted by the flash lever 30 for supplying the electric power from the battery 43. Thus, the flash lever 30 is also used as a switch member for activating the photometry circuit 45. The photometry circuit 45 is not activated when the flash lever 30 is set to the OFF position. Upon moving the flash lever 30 to the ON position, the photometry circuit 45 is activated together with the flash circuit 44.

The light receiving element 27 is mounted on the circuit board 40 to receive the subject light passing through the photometry opening 28. The photometry circuit 45 comprises an amplifier, a current-voltage conversion circuit and so forth. The photometry circuit 45 outputs a photometry signal in accordance with luminance of a subject. As to the light receiving element 27, it is possible to utilize cadmium sulfide (CdS), cadmium selenide (CdSe) and a photo diode, for example, resistance values of which change in accordance with a light-receiving amount. Otherwise, it is possible to use a photocell which generates electromotive force in accordance with a received light amount.

The photometry signal is sent to the comparator 45a being as a judging circuit to be compared with a reference signal. When the photometry signal is higher than the reference signal, an output of the comparator 45a becomes "H" to turn on the electronic switch 45b. As the electronic switch 45b, are used a transistor, a thyristor, a relay switch and so forth. Incidentally, the comparator 45a and the electronic switch 45b may be included in the photometry circuit 45.

Figure 3:
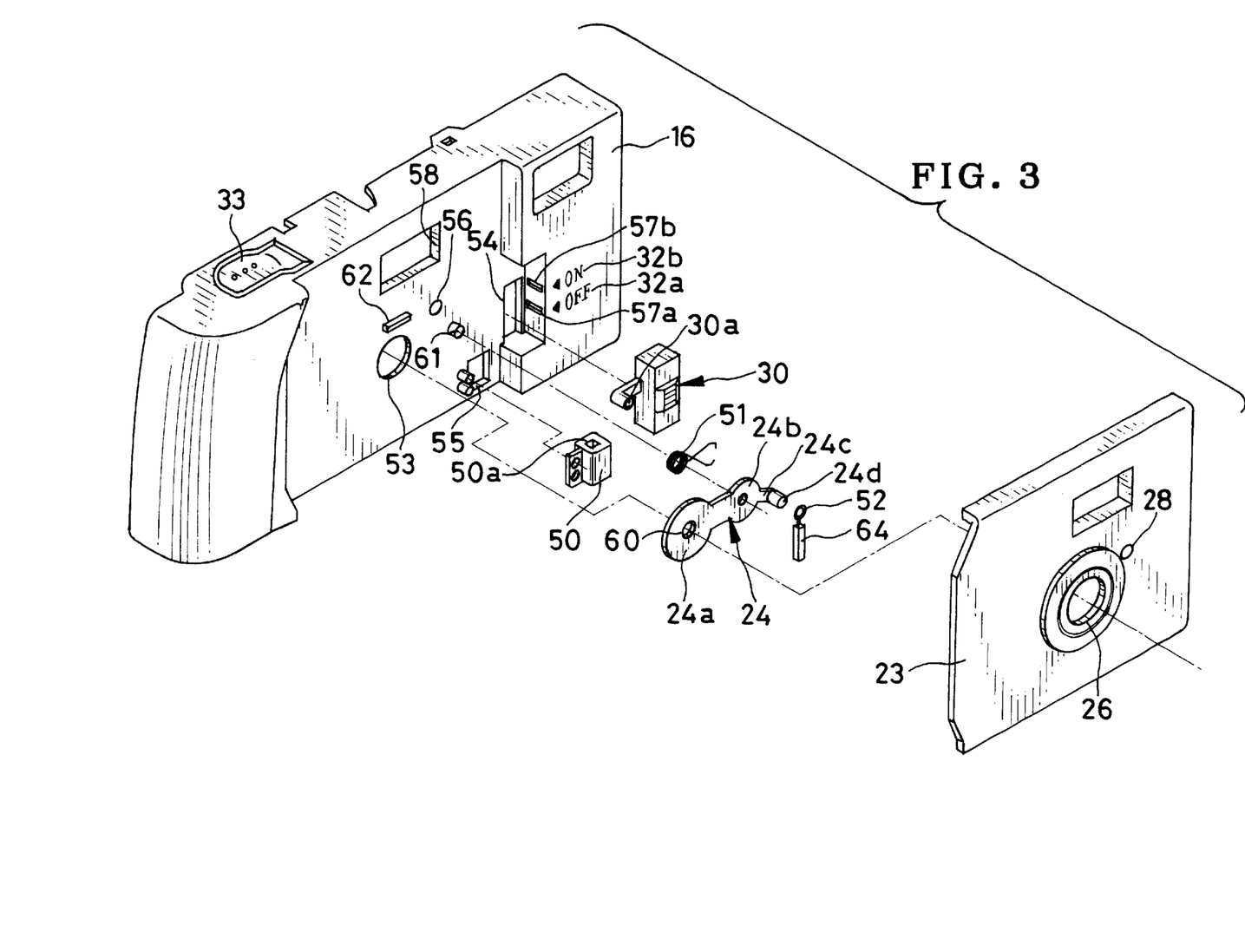
FIG. 3 is an exploded perspective view of a front cover of the lens-fitted photo film unit.

As shown in FIG. 3, between the front cover 16 and the front panel 23, are provided the stop plate 24, the electromagnet 50, a spring 51 and a retainer 52 to constitute an exposure changing mechanism together with the flash lever 30. The front cover 16 is formed with openings 53, 54, 55, 56 and 58. The opening 53 is a fixed stop opening for guiding the subject light to the dark box 37. The opening 54 is for contacting the switching segment 46 with the protrusion provided on the rear face of the flash lever 30. The opening 55 is for fitting to the electromagnet 50. The opening 56 is for bearing the light receiving element 28. The opening 58 is for baring the viewfinder 29. Moreover, a side of the flash lever 30 is provided with a second protrusion (not shown). This protrusion engages with one of cutouts 57a and 57b provided on the front cover 16 so that the flash lever 30 is adapted to stay at either of the OFF position and the ON position.

The stop plate 24 is constituted of a blade portion 24a, a mounting portion 24b and an arm portion 24c. The center of the blade portion 24a is formed with a small stop opening 60 being smaller than the fixed stop opening 53. An opening formed in the mounting portion 24b is rotatably attached to a projection member 61 provided on the front cover 16 so that the stop plate 24 is rotatable around the projection 61. The arm portion 24c is provided with a projection 24d engaging with the retainer 52. Incidentally, reference numeral 62 denotes a stopper provided on the front cover 16. The stopper 62 keeps the stop plate 24 in a first position where the small stop opening 60 are positioned at the optical axis.

Figure 4:
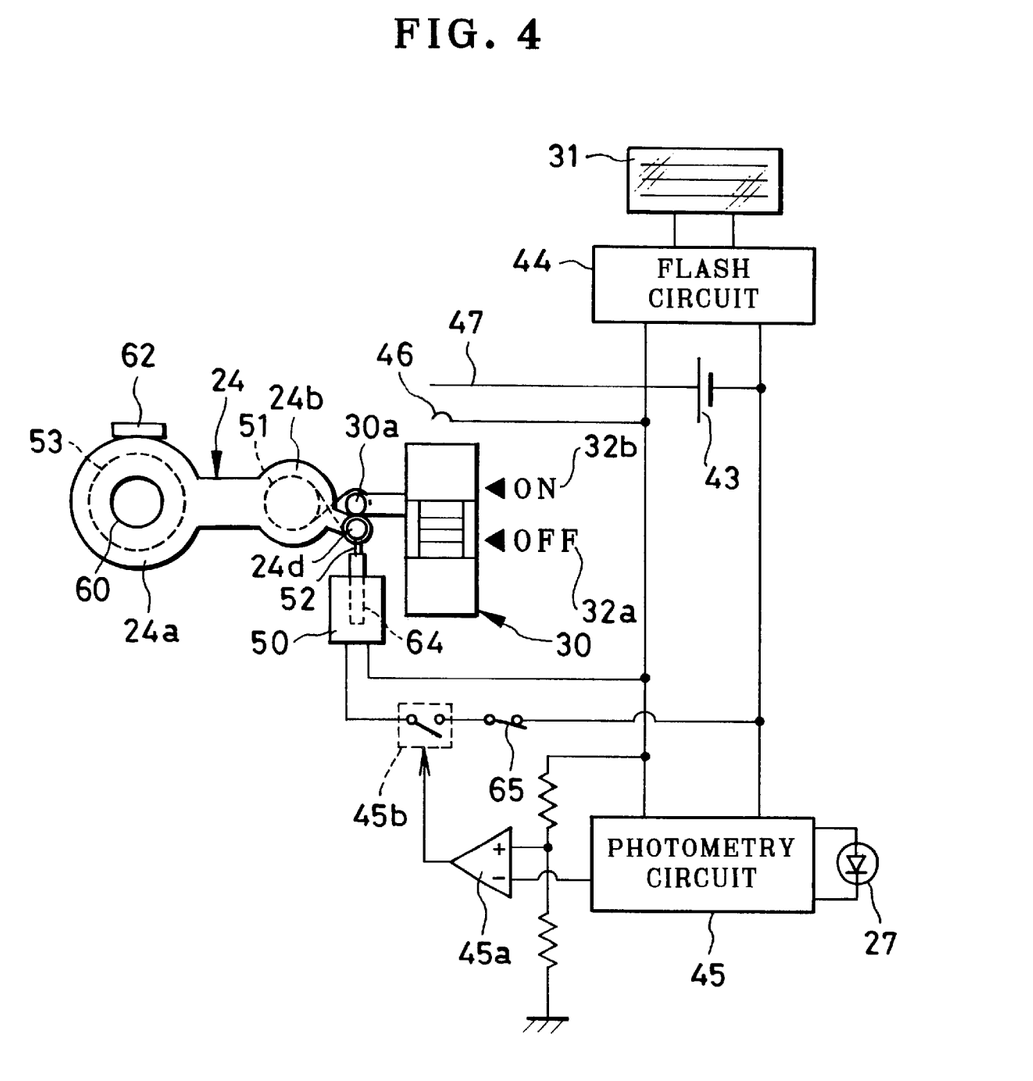
FIG. 4 is an explanatory illustration showing an operation of an exposure control mechanism under a condition that a flash switch is turned off.
Figure 5:
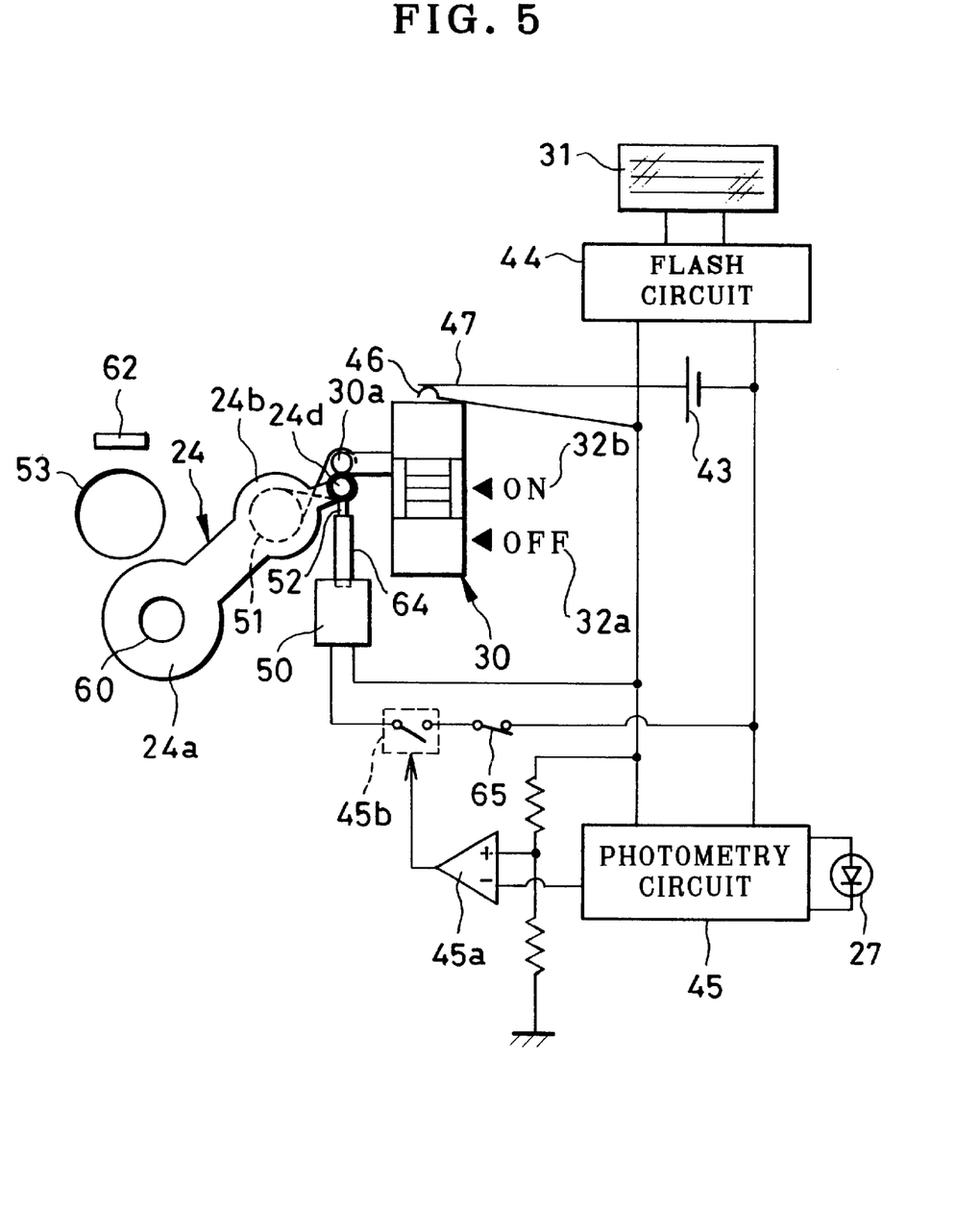
FIG. 5 is an explanatory illustration showing an operation of the exposure control mechanism under a condition that the flash switch is turned on and luminance of a subject is small.

The spring 51 is held between the front cover 16 and the stop plate 24 by means of the projection member 61 of the front cover 16. As shown in FIG. 4, one end of the spring 51 engages with a protrusion 30a of the flash lever 30, and the other end thereof engages with the projection 24d of the stop plate 24. Accordingly, the stop plate 24 is connected to the flash lever 30 via the spring 51. The spring 51 is urged in accordance with the movement of the flash lever 30, and the stop plate 24 is rotated by urging force of the spring 51. When the flash lever 30 is set to the OFF position, the stop plate 24 is kept in the first position. When the flash lever 30 is sifted to the ON position, the stop plate 24 is moved to a second position where the blade portion 24a is evacuated from the optical axis, such as shown in FIG. 5.

The electromagnet 50 is disposed at an under side of the stop plate 24 and is securely fixed to pins provided on the front cover 16. The center of the electromagnet 50 is provided with a hole 50a into which an iron plunger 64 attached to the retainer 52 is inserted. Meanwhile, a switch 65 is provided between the electromagnet 50 and the photometry circuit 45. The switch 65 is adapted to be closed in response to the half depression of the shutter button 33. At this time, in case the luminance of the subject exceeds a prescribed value, a current flows through the electromagnet 50 owing to the photometry circuit 45, the comparator 45a and the electronic switch 45b so that the iron plunger 64 is pulled into the electromagnet 50. In accordance with this, the stop plate 24 is moved from the second position to the first position against the urging force of the spring 51.

An operation of the above embodiment is described below. When photographing is not performed, the flash lever 30 is set to the OFF position. In this state, the flash circuit 44 and the photometry circuit 45 are not activated so that the battery 43 is not wasted.

A photographer rotates the knob 22 at the outset to wind the photo film 15. When the photo film 15 is wound by one frame, shutter charging is completed. At the same time, the winding stop mechanism is actuated to prohibit the rotation of the knob 22.

Successively, it is determined in accordance with luminance of a subject that photographing is performed with the flash or without the flash. In case the luminance of the subject is sufficiently large, for example, in case of outdoor photographing in a sunny day, the photographer sets the flash lever 30 to the OFF position and takes a picture. In this case, the stop plate 24 is kept in the first position by means of the stopper 62 such as shown in FIG. 4. Thus, the small stop opening 60 is disposed in front of the fixed stop opening 53. Upon depressing the shutter button 33 in this state, the shutter blade is evacuated from a photographic optical path to perform photographing. At this time, the flash circuit 44 and the photometry circuit 45 are not activated so that the battery 43 is not wasted. Incidentally, an exposure amount is reduced in virtue of the small stop opening 60. However, photographing is performed with a suitable exposure amount, since the luminance of the subject is sufficiently large.

On the other hand, in case the luminance of the subject is small, for example, in case of nighttime photographing, the photographer sets the flash lever 30 to the ON position and takes a picture. In this case, the stop plate 24 is moved to the second position in association with the movement of the flash lever 30, such as shown in FIG. 5. Moreover, the iron plunger 64 is pulled up together with the retainer 52 and is kept in a state that only a part of the plunger 64 enters the electromagnet 50. Further, the switching segment 46 comes into contact with the conductive portion 47 to activate the flash circuit 44 and the photometry circuit 45. Thus, it is performed to charge the capacitor 41 and to measure the luminance of the subject by the light receiving element 27.

When photographing is performed with the flash under a bright condition that the luminance of the subject exceeds a prescribed level such as a back-lighted scene, the photographer may take a picture, setting the flash lever 30 to the ON position. By setting the flash lever 30 to the ON position, the stop plate 24 is moved to the second position owing to the urging force of the spring 51. The light from the subject enters the light receiving element 27 so that the signal is sent from the photometry circuit 45 to the comparator 45a in accordance with the luminance of the subject. When the luminance of the subject exceeds the prescribed level, the electronic switch 45b is turned on. Upon depressing the shutter button 33 under this condition, the switch 65 is turned on at the beginning so that the battery 43 lets the electric current flow through the electromagnet 50.

Figure 6:
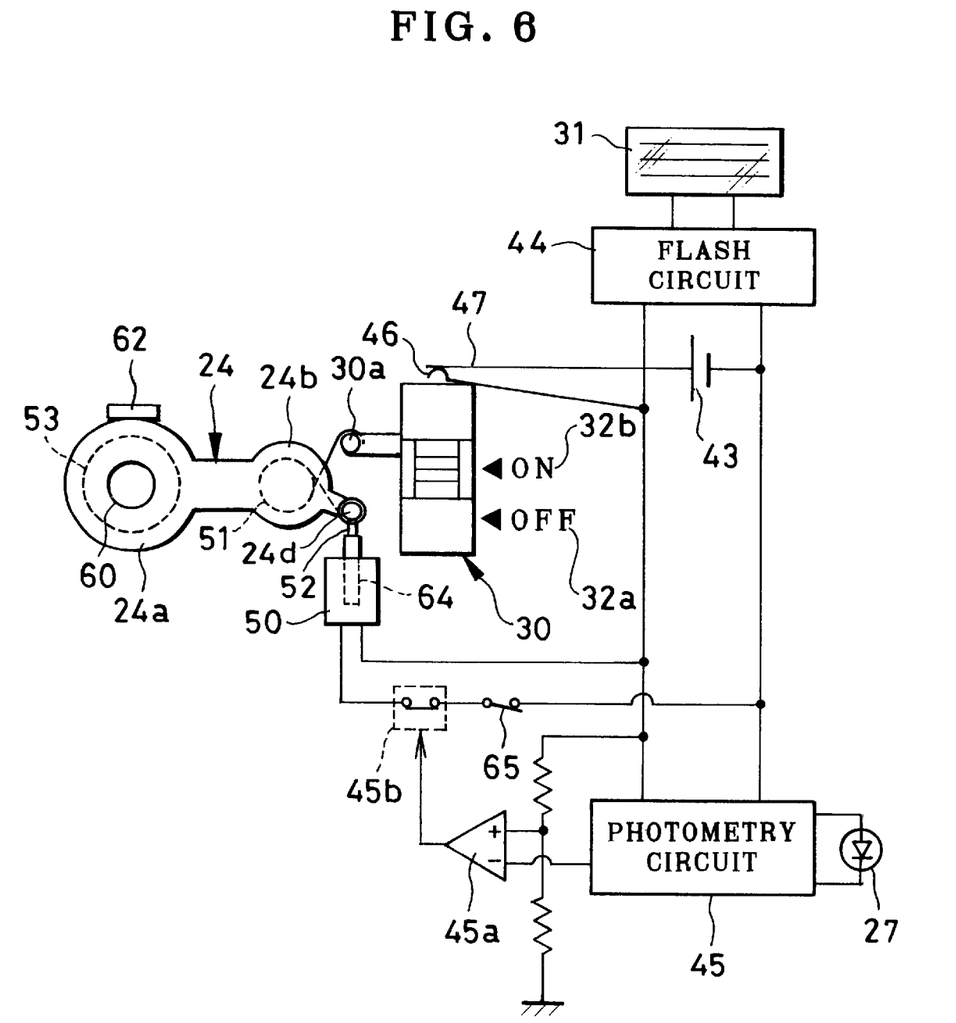
FIG. 6 is an explanatory illustration showing an operation of the exposure control mechanism under a condition that the flash switch is turned on and the luminance of the subject is large.

Thereupon, such as shown in FIG. 6, the iron plunger 64 is pulled into the electromagnet 50 against the urging force of the spring 51. Hence, the stop plate 24 is returned to the first position so that the small stop opening 60 is disposed at the optical path. Successively, the shutter button 33 is fully depressed. Then, the shutter is actuated and photographing is performed with the flash through the small stop opening 60. The main subject may be photographed with a proper exposure amount despite the back-lighted scene. Incidentally, when the luminance of the subject is lower than the prescribed level, the electronic switch 45b is turned off due to the comparator 45b so that the electric current does not flow through the electromagnet 50.

As described above, when the flash lever 30 is set to the ON position, the photometry circuit 45 is supplied with the electricity and the exposure control apparatus is changed to an operational state. Due to such structure, the stop plate 24 is disposed at the optical path only by mechanical association so that photographing is performed through the small stop opening 60 under the bright condition in which the flash is not necessary. Thus, consumption of the power source caused by the exposure control apparatus may be perfectly prevented. On the other hand, under the dark condition such that photographing is performed with the flash, the flash lever 30 is set to the ON position. In accordance with this, the stop plate 24 is evacuated from the optical path only by mechanical association to perform photographing through the fixed stop opening 53. Thus, also in this case, consumption of the power source caused by the exposure control apparatus is prevented.

When the flash lever 30 is set to the ON position under the bright condition, photographing is performed through the small stop opening 60 in virtue of the exposure control apparatus. Therefore, it is possible to carry out synchronized flash photography in the daytime. Excessive overexposure and underexposure can be avoided under various conditions, preventing the consumption of the power source.

In the above-described embodiment, the exposure control is adapted to be performed by disposition and separation of the stop plate relative to the optical path. However, the present invention is not exclusive to this. In a second embodiment according to the present invention, a stop plate is provided with smaller and larger openings which are alternately switched. As to the second embodiment, an operation thereof is described below.

Figure 7:
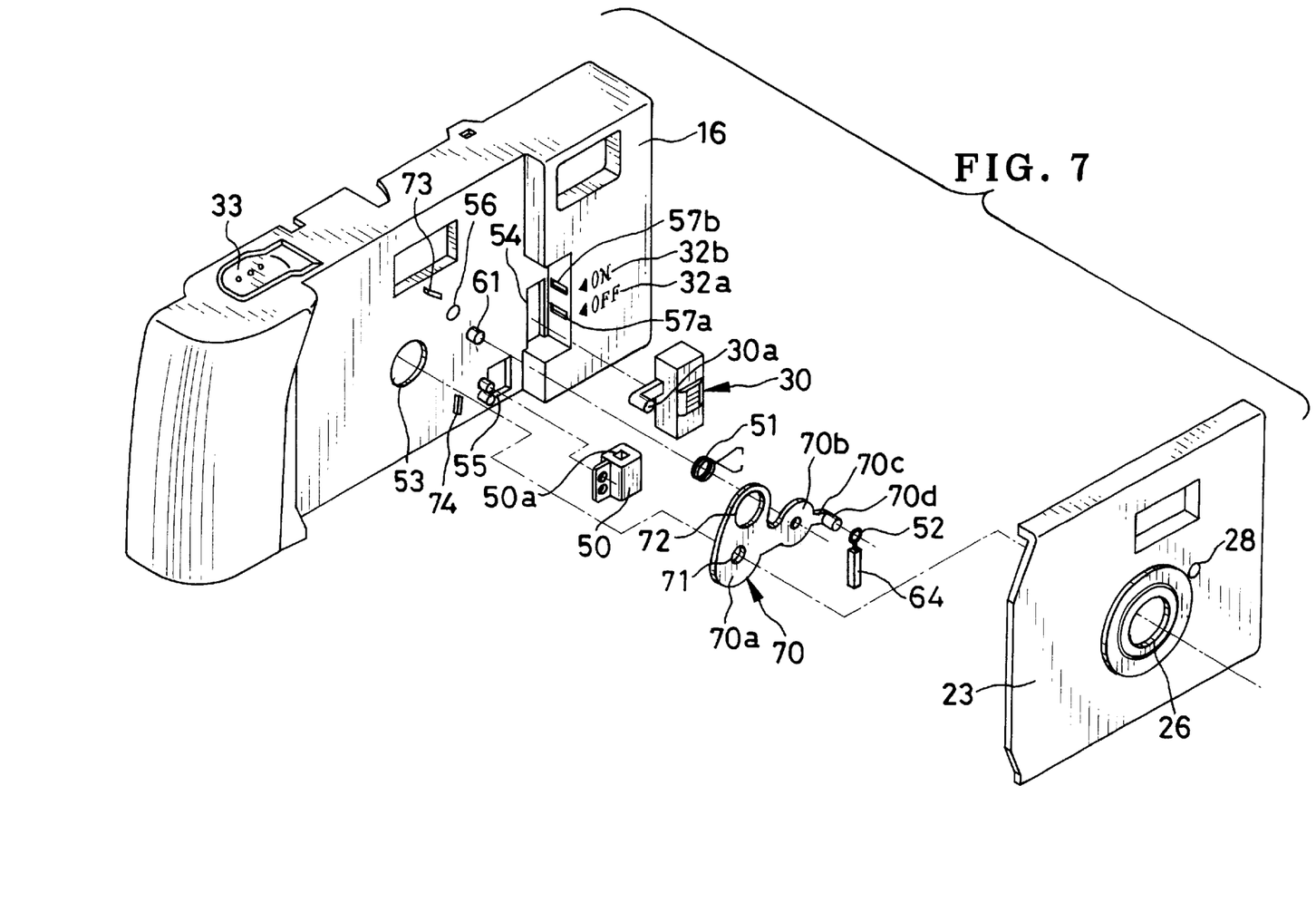
FIG. 7 is an exploded perspective view of the front cover of the lens-fitted photo film unit according to a second embodiment.

As shown in FIG. 7, a stop plate 70 is constituted of a blade portion 70a, a mounting portion 70b and an arm portion 70c. The blade portion 70a is formed with a smaller stop opening 71 and a larger stop opening 72. The smaller stop opening 71 is smaller than the fixed stop opening 53 and the larger stop opening 72 is larger than the smaller stop opening 71. An opening formed in the mounting portion 70b is rotatably attached to the projection member 61 of the front cover 16. Thus, the stop plate 70 is rotated between a third position where the smaller stop opening 71 is positioned at the optical path, and a fourth position where the larger stop opening 72 is positioned at the optical path. The arm portion 70c is integrally formed with a projection 70d engaging with both of the retainer 52 and one end of the spring 51. Incidentally, reference numerals 73 and 74 denote stoppers provided on the front cover 16 and for keeping the stop plate 70 at the third and fourth positions.

Figure 8:
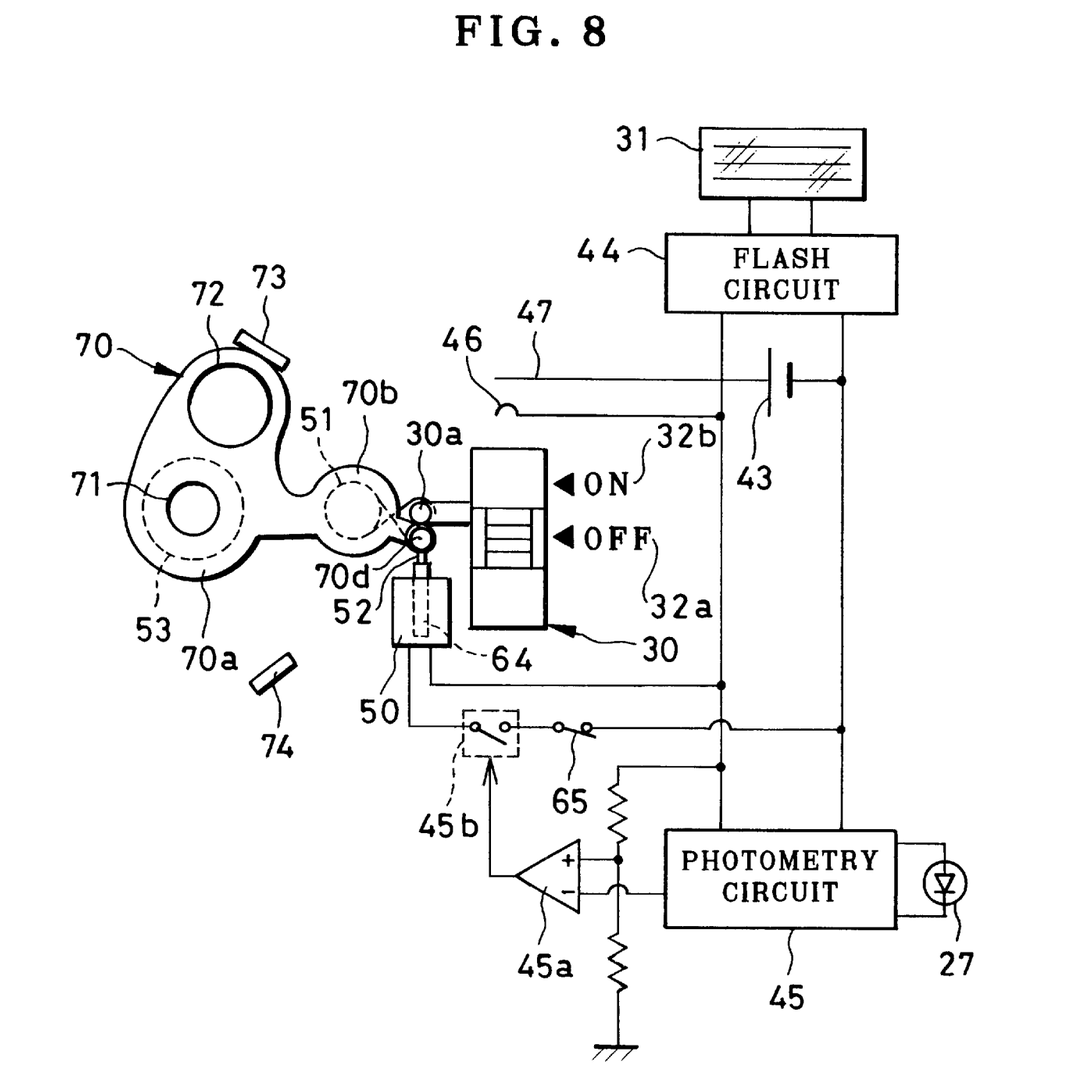
FIG. 8 is an explanatory illustration showing an operation of the exposure control mechanism under a condition that the flash switch is turned off in the second embodiment.

Under the bright condition in which flashing is not necessary, the flash lever 30 is set to the OFF position so that the stop plate 70 is kept at the third position. At this time, photographing is performed through the smaller stop opening 71. Thus, the exposure amount is reduced and is adjusted to a proper value. Hence, overexposure can be prevented. Under this condition, the flash circuit 44 and the photometry circuit 45 are not activated so that the consumption of the battery 43 is not caused.

Figure 9:
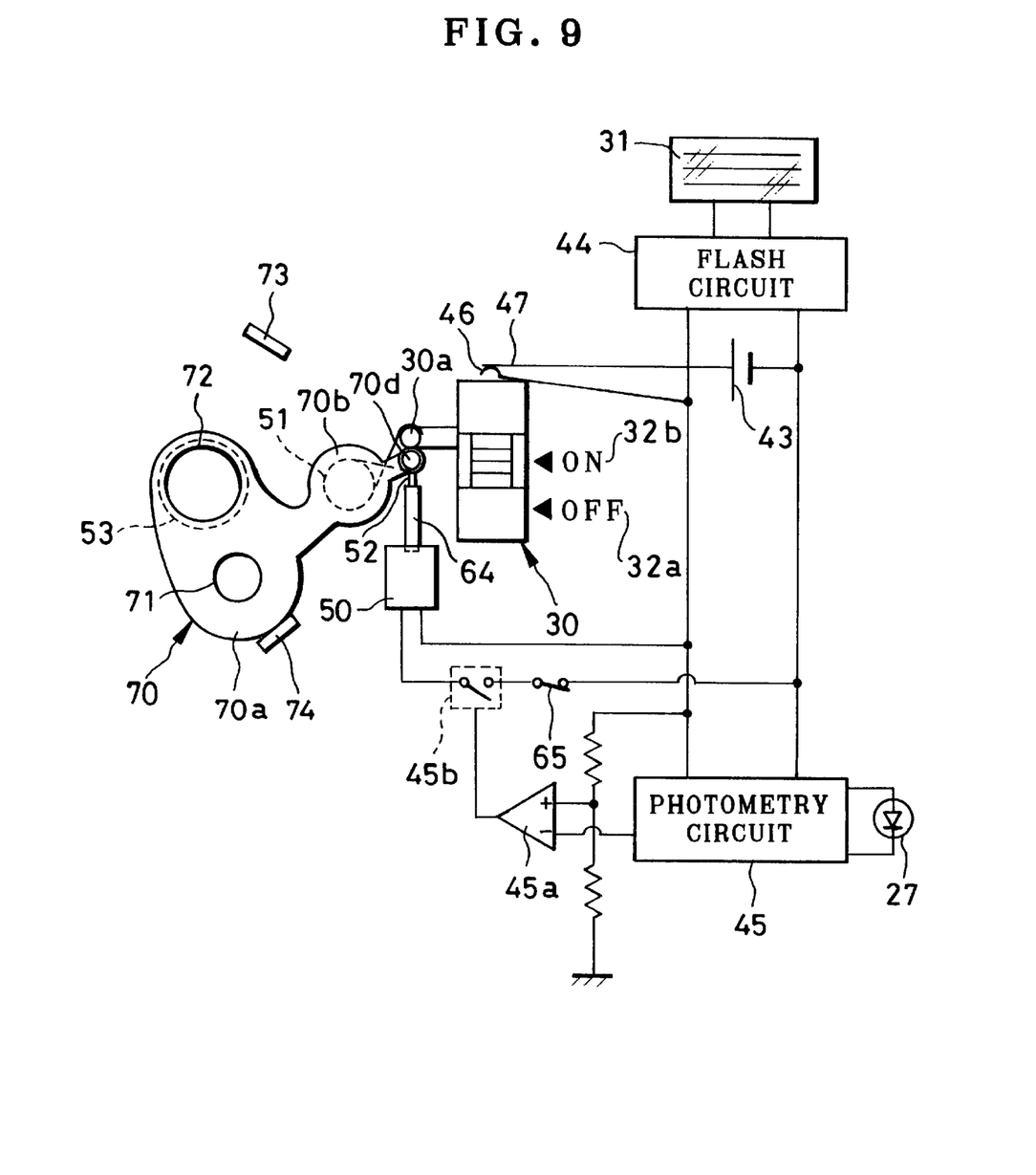
FIG. 9 is an explanatory illustration showing an operation of the exposure control mechanism under a condition that the flash switch is turned on and the luminance of the subject is small in the second embodiment.

On the other hand, under the dark condition in which photographing is performed with the flash, the flash lever 30 is moved to the ON position. In accordance with this movement, the stop plate 70 is moved to the fourth position such as shown in FIG. 9. At this time, photographing is performed through the larger stop opening 72 so that the sufficient exposure amount is obtained. In this case, the stop plate 70 is mechanically moved and the exposure control apparatus is not activated. Accordingly, the consumption of the battery 43 is prevented.

Figure 10:
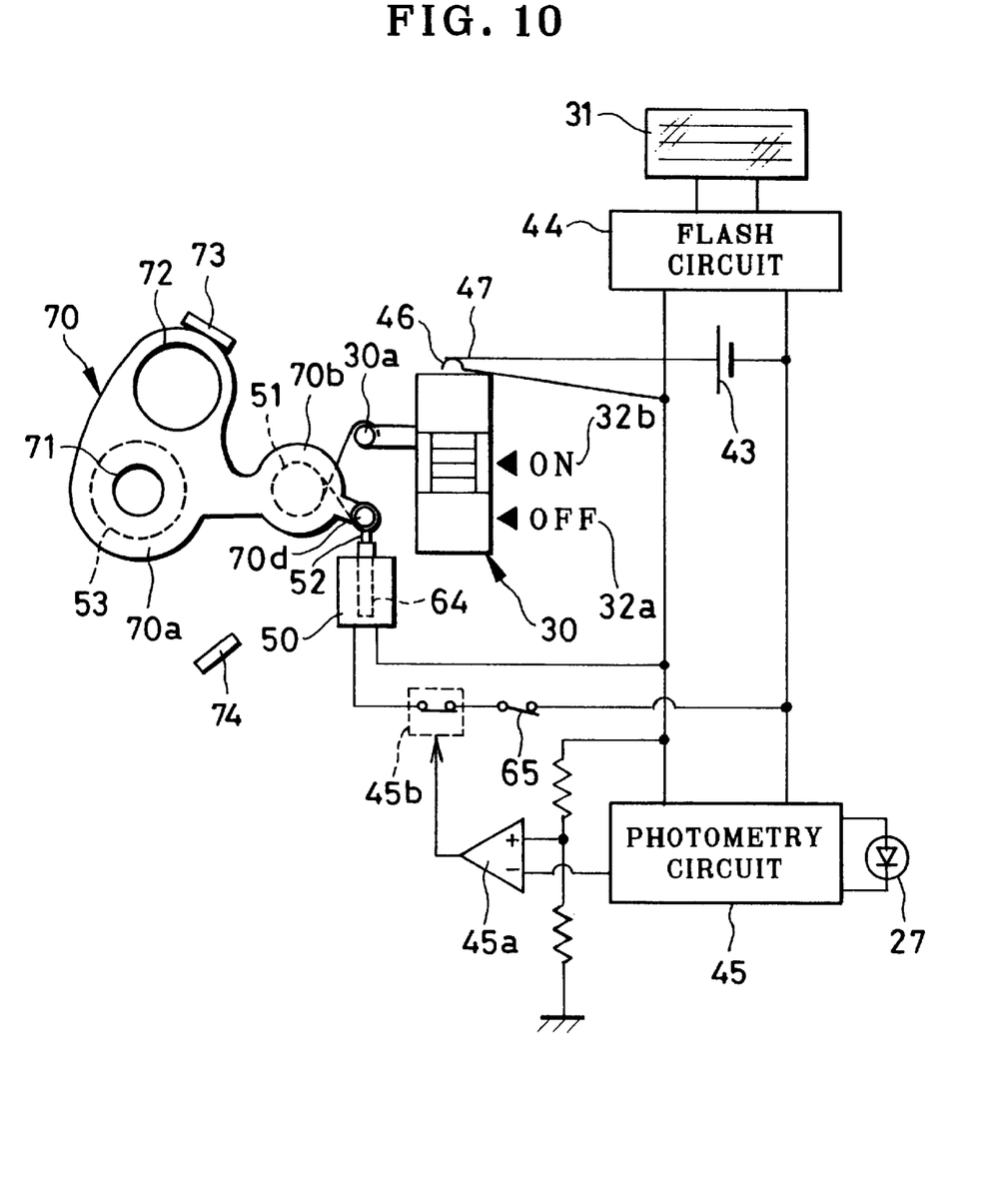
FIG. 10 is an explanatory illustration showing an operation of the exposure control mechanism under a condition that the flash switch is turned on and the luminance of the subject is large in the second embodiment.

When the flash lever 30 is set to the ON position under the bright condition, the photometry circuit 45 lets the current flow in the electromagnet 50, since the switch 65 is turned on in response to the depression of the shutter button 33. Accordingly, as shown in FIG. 10, the stop plate 70 is moved to the third position against the urging force of the spring 51. Hence, photographing is performed through the smaller stop opening 71 so that it is possible to take a picture in proper exposure.

In the above-described embodiments, the electromagnet 50 and the iron plunger 64 are employed to actuate the stop plates 24 and 70. However, it is possible to utilize a motor and a rotary solenoid on condition that the stop plates 24 and 70 are driven by electromagnetic force caused by an electric current flowing in accordance with the luminance of a subject. Otherwise, two electromagnets may be provided. in this case, it is possible to switch the stop plates 24 and 70 by selectively driving either of the electromagnets based on whether or not the subject luminance reaches a prescribed level. Further, it is possible to omit the switch 65 which is turned on in response to the half depression of the shutter button 33, as it unusual to turn on the flash lever 30 in a bright condition and as the electromagnet 50 is not driven even if the flash lever 30 is turned on to activate the photometry circuit 45 in a dark condition.

Moreover, the power-supply switch of the flash device is also used as the power-supply switch for supplying the electricity to the respective circuits of the exposure control apparatus. However, a switch turned on and off by the flash lever may be provided between the photometry circuit 45 and the battery 43. Further, if the exposure control apparatus is sufficient to be merely turned on and off, a switch may be connected in series to the light receiving element 27, the comparator 45a or the electromagnet 50. Furthermore, the flash lever includes not only the slide type but also a push type.

As stated above, the camera according to the present invention comprises the exposure control apparatus including the photometry circuit and the light regulating unit. The photometry circuit measures the luminance of the ambient light. Further, the photometry circuit judges whether or not the measured luminance is higher than the prescribed level. When the luminance of the ambient light is judged to be higher than the prescribed level, the light regulating unit reduces the exposure light passing through the taking lens. Feeding the electricity to the exposure control apparatus is performed in association with the turning-on operation of the flash switch for activating the built-in flash device. Accordingly, the power source may be prevented from being wasted without providing a power-source switch for the exposure control apparatus.

Moreover, feeding the electricity to the exposure control apparatus is interrupted when the shutter button is not depressed. Thus, the consumption of the power source is further prevented.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An exposure control apparatus used for a camera having a taking lens and a flash device, said exposure control apparatus comprising:

measurement means for measuring luminance of ambient light;

judgment means for judging whether or not said luminance of the ambient light is higher than a prescribed level; and light-amount regulating means for reducing exposure light passing through said taking lens when said measured luminance of the ambient light is higher than said prescribed level, wherein said exposure control apparatus is actuatable when said flash device is actuatable, wherein said flash device is turned on when photographing is performed with a flash, said flash device having a flash switch for receiving electricity from a battery, and a flash operation member for turning on and off said flash switch, said exposure control apparatus being supplied with electricity by said battery in association with an on-operation of said flash operation member, in order to make said exposure control apparatus actuatable.

2. An exposure control apparatus according to claim 1, wherein said flash switch is also used as a power-supply switch for said exposure control apparatus.

3. An exposure control apparatus according to claim 2, wherein said light-amount regulating means includes a movable stop plate provided with an opening smaller than a fixed exposure aperture, when said flash switch is turned off, said stop plate being set to a first position where said opening is disposed at an optical axis of said taking lens, whereas when said flash switch is turned on and the luminance of the ambient light is said prescribed level or less, said stop plate being set to a second position evacuated from said optical axis, and when said flash switch is turned on and the luminance of the ambient light exceeds said prescribed level, said stop plate being set to said first position.

4. An exposure control apparatus according to claim 3, wherein said light-amount regulating means further comprising:

a spring for keeping said stop plate at said second position when said flash switch is turned on and the luminance of the ambient light is said prescribed level or less; and an electromagnetic unit supplied with electricity when said flash switch is turned on and the luminance of the ambient light is higher than said prescribed level, said electromagnetic unit setting said stop plate to said first position against said spring.

5. An exposure control apparatus according to claim 4, further comprising:

an actuation switch connected in serial to said electromagnetic unit and for actuating said electromagnetic unit, said actuation switch being closed in response to depression of a shutter button so that said electromagnetic unit is prevented from being supplied with electricity under a non-depressing condition of said shutter button.

6. An exposure control apparatus according to claim 5, wherein said electromagnetic unit includes an electromagnet connected to said actuation switch, and a plunger pulled into said electromagnet.

7. An exposure control apparatus according to claim 6, wherein the top of said plunger is provided with a retainer for holding a projection formed on said stop plate.

8. An exposure control apparatus according to claim 7, wherein one end of said spring engages with said projection held by said retainer, and the other end of said spring engages with a protrusion formed on said flash operation member.

9. An exposure control apparatus according to claim 8, further comprising:

a stopper for halting said stop plate at said first position.

10. An exposure control apparatus according to claim 2, wherein said light-amount regulating means includes a movable stop plate provided with a first opening smaller than a fixed exposure aperture and a second opening larger than said first opening, when said flash switch is turned off, said stop plate being set to a first position where said first opening is disposed at an optical axis of said taking lens, and when said flash switch is turned on and the luminance of the ambient light is said prescribed level or less, said stop plate being set to a second position where said second opening is disposed at said optical axis.

11. An exposure control apparatus according to claim 10, wherein said second opening is smaller than said fixed exposure aperture.

12. An exposure control apparatus according to claim 11, further comprising:

a spring for keeping said stop plate at said second position when said flash switch is turned on and the luminance of the ambient light is said prescribed level or less; and an electromagnetic unit supplied with electricity when said flash switch is turned on and the luminance of the ambient light is higher than said prescribed level, said electromagnetic unit setting said stop plate to said first position against said spring.

13. An exposure control apparatus according to claim 12, further comprising:

an actuation switch connected in serial to said electromagnetic unit and for actuating said electromagnetic unit, said actuation switch being closed in response to depression of a shutter button so that said electromagnetic unit is prevented from being supplied with electricity under a non-depressing condition of said shutter button.

14. An exposure control apparatus according to claim 13, wherein said electromagnetic unit includes an electromagnet connected to said actuation switch, and a plunger pulled into said electromagnet.

15. An exposure control apparatus according to claim 14, wherein the top of said plunger is provided with a retainer for holding a projection formed on said stop plate.

16. An exposure control apparatus according to claim 15, wherein one end of said spring engages with said projection held by said retainer, and the other end of said spring engages with a protrusion formed on said flash operation member.

17. An exposure control apparatus according to claim 16, further comprising:

a first stopper for halting said stop plate at said first position; and a second stopper for halting said stop plate at said second position.

18. An exposure control apparatus used for a camera having a taking lens and a flash device, said exposure control apparatus comprising:

an ambient luminance measuring device;

a flash power switch having an ON and an OFF position; and a light regulating element constructed to selectively pass either a first or second amount of light to a photographic film, wherein the first amount is greater than the second amount;

wherein the ambient luminance measuring device and the flash power switch are connected to control the light regulating element so that:

if the flash power switch is in the OFF position, the light regulation element is set to pass the second amount of light;

if the flash power switch is in the ON position and the ambient luminance measuring device measures lower than a predetermined threshold level of luminance, the light regulating element is set to pass the first amount of light; and if the flash power switch is in the ON position and the ambient luminance measuring device measures greater than the predetermined threshold level of luminance, the light regulation element is set to pass the second amount of light.

19. The exposure control apparatus of claim 18, wherein the flash power switch is electrically connected to the flash device and the ambient luminance measuring device so that each of the flash device and the ambient luminance measuring device is provided with power only if the flash power switch is in the ON position.

20. The exposure control control apparatus of claim 18, wherein the ambient luminance measuring device is connected to the light regulating element through a solenoid, the solenoid being powered only if the flash power switch is in the ON position and the ambient luminance measuring device measures greater than the predetermined threshold level of luminance.

21. The exposure control apparatus of claim 20, wherein the solenoid is powered only if a shutter button Is at least partially depressed.

* * * * *